(12) United States Patent
Koyama et al.

(10) Patent No.: US 6,947,675 B2
(45) Date of Patent: Sep. 20, 2005

(54) REMOTE MAINTENANCE AND DIAGNOSIS OF OFFICE OR DOMESTIC APPLIANCES

(75) Inventors: Kiyohisa Koyama, Kanagawa (JP); Akira Takehisa, Tokyo (JP); Keiichi Suzuki, Tokyo (JP); Youichi Onodera, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 288 days.

(21) Appl. No.: 10/136,228

(22) Filed: May 2, 2002

(65) Prior Publication Data

US 2002/0183978 A1 Dec. 5, 2002

(30) Foreign Application Priority Data

May 2, 2001 (JP) ........................................ 2001-135286
Oct. 15, 2001 (JP) ........................................ 2001-316680

(51) Int. Cl.[7] ............................................. G03G 21/00
(52) U.S. Cl. ............................................. 399/8; 714/27
(58) Field of Search ........................... 702/188; 399/8; 714/27, 25; 709/203, 218, 230; 707/104.1; 370/282

(56) References Cited

U.S. PATENT DOCUMENTS

| | | | |
|---|---|---|---|
| 4,965,748 A | 10/1990 | Chang et al. ................. 710/66 |
| 4,977,519 A | 12/1990 | Chang et al. ................. 358/1.2 |
| 4,984,182 A | 1/1991 | Chang et al. ............... 358/1.17 |
| 5,058,038 A | 10/1991 | Motoyama et al. ........... 358/1.2 |
| 5,206,932 A | 4/1993 | Chang et al. ................ 345/520 |
| 5,276,781 A | 1/1994 | Chang et al. ............... 358/1.17 |
| 5,299,310 A | 3/1994 | Motoyama .................. 345/545 |
| 5,319,748 A | 6/1994 | Motoyama .................. 345/501 |
| 5,353,388 A | 10/1994 | Motoyama ................. 358/1.18 |
| 5,375,204 A | 12/1994 | Motoyama et al. ......... 345/543 |
| 5,394,544 A | 2/1995 | Motoyama et al. ........... 714/31 |
| 5,396,345 A | 3/1995 | Motoyama ................. 358/448 |
| 5,412,779 A | 5/1995 | Motoyama ...................... 399/8 |
| 5,416,896 A | 5/1995 | Motoyama .................. 715/514 |
| 5,422,992 A | 6/1995 | Motoyama et al. ......... 715/516 |
| 5,425,135 A | 6/1995 | Motoyama et al. ........ 358/1.15 |
| 5,436,627 A | 7/1995 | Motoyama et al. ........... 341/67 |
| 5,446,837 A | 8/1995 | Motoyama et al. ......... 715/514 |
| 5,448,691 A | 9/1995 | Motoyama .................. 715/525 |
| 5,483,629 A | 1/1996 | Motoyama et al. ......... 715/514 |
| 5,487,165 A | 1/1996 | Tsay et al. .................. 707/102 |
| 5,499,329 A | 3/1996 | Motoyama et al. ......... 715/513 |
| 5,504,891 A | 4/1996 | Motoyama et al. ......... 715/513 |
| 5,506,985 A | 4/1996 | Motoyama et al. ......... 715/523 |
| 5,535,318 A | 7/1996 | Motoyama et al. ......... 715/514 |
| 5,537,554 A | 7/1996 | Motoyama .................. 710/100 |
| 5,544,289 A | 8/1996 | Motoyama .................. 710/100 |
| 5,548,687 A | 8/1996 | Motoyama .................. 345/423 |
| 5,550,614 A | 8/1996 | Motoyama .................... 399/18 |
| 5,568,618 A | 10/1996 | Motoyama .................. 710/100 |
| 5,638,186 A | 6/1997 | Motoyama .................. 358/448 |

(Continued)

FOREIGN PATENT DOCUMENTS

| | | |
|---|---|---|
| EP | 0 599 606 | 6/1994 |
| EP | 0 782 048 | 7/1997 |
| EP | 0 843 230 | 5/1998 |

OTHER PUBLICATIONS

U.S. Appl. No. 10/026,742, filed Dec. 27, 2001, pending.

*Primary Examiner*—Marc S. Hoff
*Assistant Examiner*—Victor J. Taylor
(74) *Attorney, Agent, or Firm*—Oblon, Spivak, McClelland, Maier & Neustadt, P.C.

(57) ABSTRACT

A remote maintenance and diagnosis apparatus for making a diagnosis of a remote client appliance comprises a data acquisition unit that acquires data necessary to diagnose the client appliance, a diagnosing unit that make an automatic diagnosis of the client appliance based on the data acquired by the data acquisition unit, and an automatic diagnosis result reporting unit that reports a result of the automatic diagnosis to the client appliance.

30 Claims, 17 Drawing Sheets

U.S. PATENT DOCUMENTS

| | | | | |
|---|---|---|---|---|
| 5,649,120 | A | 7/1997 | Motoyama | 710/100 |
| 5,701,184 | A | 12/1997 | Motoyama | 358/450 |
| 5,710,967 | A | 1/1998 | Motoyama | 399/377 |
| 5,715,496 | A | 2/1998 | Sawada et al. | 399/8 |
| 5,765,006 | A | 6/1998 | Motoyama | 715/514 |
| 5,774,678 | A | 6/1998 | Motoyama | 710/100 |
| 5,818,603 | A | 10/1998 | Motoyama | 358/296 |
| 5,819,110 | A | 10/1998 | Motoyama | 710/15 |
| 5,848,386 | A | 12/1998 | Motoyama | 704/5 |
| 5,887,216 | A | 3/1999 | Motoyama | 399/8 |
| 5,909,493 | A | 6/1999 | Motoyama | 713/154 |
| 5,995,678 | A | 11/1999 | Motoyama | 382/284 |
| 6,005,850 | A | 12/1999 | Moura et al. | 370/282 |
| 6,009,436 | A | 12/1999 | Motoyama et al. | 707/102 |
| 6,078,931 | A | 6/2000 | Motoyama | 707/203 |
| 6,085,196 | A | 7/2000 | Motoyama et al. | 707/102 |
| 6,208,956 | B1 | 3/2001 | Motoyama | 704/2 |
| 6,260,048 | B1 | 7/2001 | Carpenter et al. | 707/104.1 |
| 6,279,015 | B1 | 8/2001 | Fong et al. | 715/523 |
| 6,301,670 | B1 | 10/2001 | Motoyama et al. | 713/300 |
| 6,304,948 | B1 | 10/2001 | Motoyama et al. | 711/162 |
| 6,330,628 | B1 | 12/2001 | Motoyama | 710/105 |
| 6,411,606 | B1 | 6/2002 | Moura et al. | 370/282 |
| 6,421,608 | B1 | 7/2002 | Motoyama et al. | 701/213 |
| 6,456,402 | B1 | 9/2002 | Motoyama | 358/450 |
| 6,473,812 | B2 | 10/2002 | Motoyama | 710/15 |
| 6,476,930 | B1 | 11/2002 | Roberts et al. | 358/1.18 |
| 6,578,090 | B1 | 6/2003 | Motoyama et al. | 719/315 |
| 6,581,092 | B1 | 6/2003 | Motoyama et al. | 709/219 |
| 6,631,247 | B1 | 10/2003 | Motoyama et al. | 399/8 |
| 6,650,431 | B1 | 11/2003 | Roberts et al. | 358/1.15 |
| 6,662,225 | B1 | 12/2003 | Motoyama et al. | 709/224 |
| 6,678,867 | B2 | 1/2004 | Fong et al. | 715/523 |
| 6,714,971 | B2 | 3/2004 | Motoyama et al. | 709/219 |
| 6,745,154 | B2 * | 6/2004 | Mifune et al. | 702/188 |
| 6,748,299 | B1 | 6/2004 | Motoyama | 372/45 |
| 6,772,096 | B2 * | 8/2004 | Murakami et al. | 702/184 |
| 2002/0091971 | A1 | 7/2002 | Sawada | 399/9 |

* cited by examiner

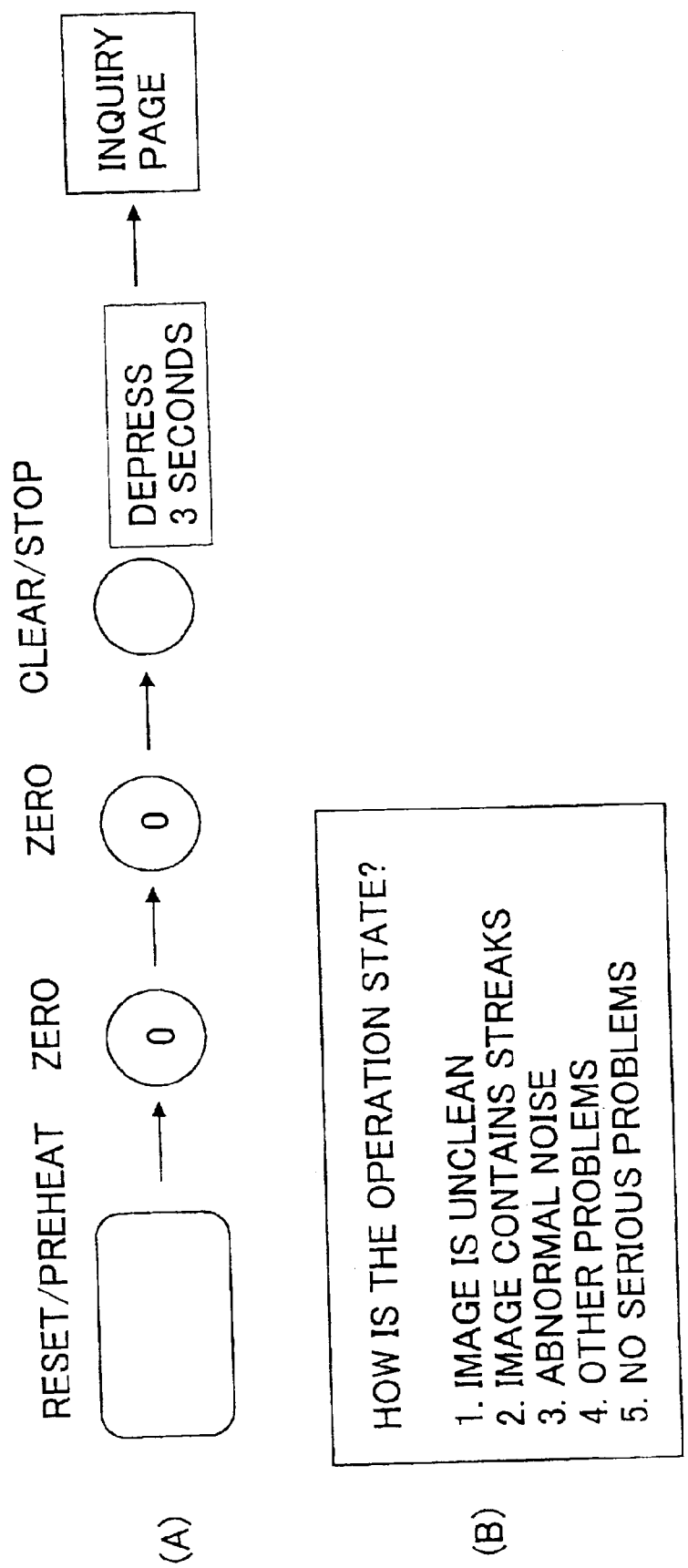

PLANNED REMOTE DIAGNOSIS LIST

SS: X X X X X X X X X     XXXXXX     CE: X X X X X X X X     XXXX     CREATED YY/MM/DD     PAGE999
                                                                      AUTOMATIC DIAGNOSIS DATE YY/MM/DD

DIAGNOSIS RESULT: VISIT NOT REQUIRED

| PLANNED INSPECTION DATE | CUSTOMER NAME & ADDRESS | TEL | PERSON IN CHARGE & SECTION | APPLIANCE, TYPE, NUMBER | REPORT # MAIL ADDRESS FACSIMILE NO. | ACV1 & ACV2 | INTERVIEW RESULT |
|---|---|---|---|---|---|---|---|
| YY.MM.DD | KKKKKKK<br>KKKKKKKKKKKKKKKKKK<br>REASON: XXXXXXXXXXXXXXXXXXX | 99-9999-9999 | KKKKKK<br>KKKKKK<br>ADDRESSEE: XXXXXXXXXXX | XXXXXXXXXXXXX<br>XXXXXX-XXXXX | YMMDD@123456<br>99-9999-9999 | 9999999<br>9999999 | REQUIRED/<br>NOT REQUIRED |
| YY.MM.DD | KKKKKKK<br>KKKKKKKKKKKKKKKKKK<br>REASON: XXXXXXXXXXXXXXXXXXX | 99-9999-9999 | KKKKKK<br>KKKKKK<br>ADDRESSEE: XXXXXXXXXXX | XXXXXXXXXXXXX<br>XXXXXX-XXXXX | YMMDD@123456<br>99-9999-9999 | 9999999<br>9999999 | REQUIRED/<br>NOT REQUIRED |
| YY.MM.DD | KKKKKKK<br>KKKKKKKKKKKKKKKKKK<br>REASON: XXXXXXXXXXXXXXXXXXX | 99-9999-9999 | KKKKKK<br>KKKKKK<br>ADDRESSEE: XXXXXXXXXXX | XXXXXXXXXXXXX<br>XXXXXX-XXXXX | YMMDD@123456<br>99-9999-9999 | 9999999<br>9999999 | REQUIRED/<br>NOT REQUIRED |

*FIG. 7*

DIAGNOSIS REPORT    VISIT NOT REQUIRED

YY/MM/DD

USER NAME: X X X X X  
ADDRESS: X X X X X  
TEL: X X X X  
FAX: X X X X  
PERSON IN CHARGE: X X X X

APPLIANCE: X X X X  
APPLIANCE CODE: X X X X  
NUMBER: X X X X

CE: X X X X

Visit inspection is not required according to the remote monitoring and diagnosis result.

·Consultation (mm/dd - mm/dd)

| CSS center entry date | CE visiting date | Condition | Measures/Results | Subsequent condition |
|---|---|---|---|---|
| 5/31 | - | Successive paper jam at manual feed tray | Instruction over the phone | Paper still jams |
| 6/1 | - | Paper jam at manual feed tray | Sent CE | - |
| - | 6/1 | " | Change manual feed roller/ good condition | Jam reduced |
| 6/15 | - | " | Sent CE | - |
| - | 6/15 | " | Change control panel/ good condition | Paper no longer jams |

FIG. 8A

|  | Before Repair | After Repair |
|---|---|---|
| Jam at manual feed tray | 13 | 1 |
| MCBJ (manual) | 985 | 8,701 |

・Other information    Current: yy/mm/dd - yy/mm/dd    Previous: yy/mm/dd - yy/mm/dd

| Jam occurrence | now | before |
|---|---|---|
| Total of transfer paper jams | 6 | 11 |
| Location: first tray | 3 | 9 |
| resist | 1 | 2 |
| duplex entrance | 2 | 0 |
| Size: A4 sideways | 5 | 8 |
| A4 lengthwise | 1 | 3 |
| CC101: successive paper jam | 0 | 0 |
| CC201: continued jammed condition | 0 | 0 |
| MCBJ | 2,583 | 1,308 |

| # of copies per tray (paper size) | now | before |
|---|---|---|
| Tray 1 (A4 sideways) | 29,015 | 14,068 |
| Tray 2 (A4 lengthwise) | 9,524 | 8,701 |
| Tray 3 (A4 lengthwise) | 1,377 | 2,029 |
| Tray 4 (A5 lengthwise) | 633 | 223 |
| Manual feed | 19 | 11 |

| # of copies per mode | now | before |
|---|---|---|
| Duplex | 69,026 | 4,488 |
| Electronic sort | 22,881 | 15,522 |

| Total of original jams | now | before |
|---|---|---|
| Occurrence of original jam | 1 | 3 |
| Location: feeder | 1 | 3 |

| ADF use | now | before |
|---|---|---|
| # of originals fed through | 30,976 | 18,340 |
| # of scans | 30,982 | 18,324 |
| # of double-face originals | 256 | 138 |
| # of copies in thin-paper mode | 0 | 0 |

*FIG. 8B*

| Service call | now | before |
|---|---|---|
| Total # of service calls | 2 | 3 |
| SC390: T sensor malfunction | 1 | 0 |
| SC401: Detection of transfer leak | 0 | 1 |
| SC501: First feeder tray malfunction | 1 | 2 |

| Use of copy | now | before |
|---|---|---|
| ACV | 28,737 | 40,955 |

| Toner control | now | before |
|---|---|---|
| T sensor: $V_T$ | 1.29 | 2.15 |
| P sensor: $V_{SG}$ | 4.05 | 4.09 |
| P sensor: $V_{SP}$ | 0.49 | 0.25 |

| ROM version | Current | Update | TI No. |
|---|---|---|---|
| Main body | A2295103P | A2295103R | A229-990077 |
| CSS(PI) | A2325372B | - | - |
| HDC | A6915171 | - | - |
| ADF | A8065610P | - | - |
| Scanner | A2295106 | - | - |
| Finisher | A6975651E | A6975651F | A697-990012 |
| Punc. | A2295136A | - | - |

INITIAL PAGE FOR ENTRY OF INTERVIEW RESULT

*Planed Remote Diagnosis, Interview Key Input*

① ~ Section code: [XXXXXX]
② ~ CE code: [XXXXXX]
③ ~ Date of remote diagnosis: [YYMMDD]
④ ~ Appliance type, product number: [XXXXXX] [XXXXXXXXX]
⑤ ~ Report No.: [XXXXXXXXX]
⑥ ~ Select: [1]  (1:input interview result  2:confirmation of report)

FIG.10

REMOTE DIAGNOSIS REPORT CONFIRMATION PAGE

Remote Diagnosis Customer Report

Section XXXXXXX  CE  XXXXXX
Report No. YMMDDC123456  Mailing Date YYMMDD
Customer      XXXXXXXXXXXXXXXXXXXXXXXXXXXXXX
Address       XXXXXXXXXXXXXXXXXXXXXXXXXXXXXX
Mailing Address XXXXXXXXXXXXXXXXXXXXXXXXXXXXXX
Facsimile     99-9999-9999
Appliance XXXXXXXXXXXX  Type and Number XXXXXX  XXXXXX
Located XXXXXXXXXXXXXXXXXXXXXXXXXXXXXXXX
Diagnosis Date YYMMDD   Diagnosis Result XXXX   Interview Result XXXX
General Result

| | | # of copies (paper size) | | |
|---|---|---|---|---|
| ① Reading unit | Good | A5 | B4 | 999,999 |
| | | 999,999 | | |
| ② Imaging unit | Good | B5 | A3 | 999,999 |
| | | 999,999 | | |
| ③ Fixing unit | Good | A4 | | |
| | | 999,999 | | |
| | | # of copies (mode) | | |
| ④ Paper transport unit | Inspection required | Duplex | Stapling | 999,999 |
| | | 999,999 | | |
| | | ADF | Manual feed | 999,999 |
| | | 999,999 | | |
| Others/options | Good | Sorter | | |
| | | 999,999 | | |

| Comments | XXXXXXXXXXXXXXXXXXXXXXXXXXXXXX<br>XXXXXXXXXXXXXXXXXXXXXXXXXXXXXX<br>XXXXXXXXXXXXXXXXXXXXXXXXXXXXXX<br>XXXXXXXXXXXXXXXXXXXXXXXXXXXXXX |
|---|---|

FIG.11

INTERVIEW RESULT INPUT PAGE

*Planed Remote Diagnosis Interview Input*

Section XXXXXXXXXX  CE XXXXXXXXXXXXX
Appliance  XXXXXXXXXXXXXXXXXX
Type & number  XXXXXX  XXXXXXXX
Diagnosis Date YYMMDD  Planned date  YYMMDD
Diagnosis Result...XXXXXX  Report No.......XYMMDDG123456

① ~ Interview Result    [X] XXXXXX  (1.Visit required    2.Visit not required)
                        XXXXXXXXXXXXXXXXXXXXXXXXXXXXXX
                        XXXXXXXXXXXXXXXXXXXXXXXXXXXXXX ② ~ Reason for Change ③ ~ Scheduled Visiting Date  [YYMMDD]

④ ~ Customer                 XXXXXXXXXXXXXXXXXXXXXXXXXXXXXX
     Address                 XXXXXXXXXXXXXXXXXXXXXXXXXXXXXX
     Location ⑤ ~ Registered Mailing Address  XXXXXXXXXXXXXXXXXXXX
                                XXXXXXXXXXXXXXXXXXXX ⑥ ~ Facsimile            [99-9999-9999]
     Type of Transmission  [1] FAX  (1: FAX,  2: Other than FAX)

FIG.12

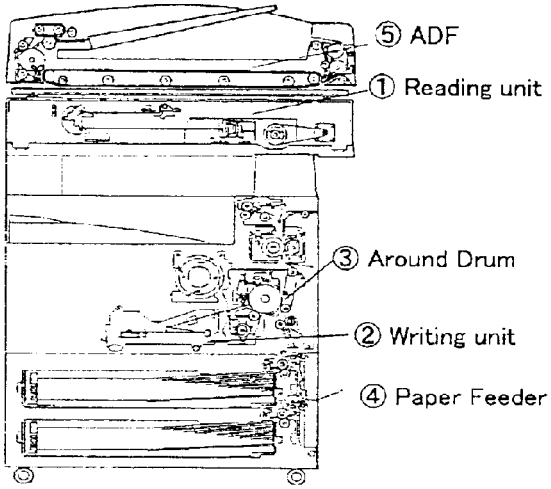

PLANNED REMOTE DIAGNOSTIC REPORT | Visit inspection NOT required

YY/MM/DD

General Manager
ABC Co., Ltd.

The following is the analysis result of remote diagnosis for the photocopier.

- Type: × × × ×
- Number: × × × ×
- Located: × × × ×
- Diagnosis Date: × × × ×

Current Monitoring Result

| UNIT | RESULT |
|---|---|
| ① Reading unit | Normal |
| ② Writing unit | Normal |
| ③ Around Drum | Normal |
| ④ Paper Feeder | Normal |
| ⑤ ADF | Normal |

·USAGE (Current 3 months)

·# of copies (paper size)

| A5 | B5 | A4 | B4 | A3 | total |
|---|---|---|---|---|---|
| 0 | 356 | 32,819 | 159 | 951 | 34,285 |

·# of copies (others)

| duplex | ADF | sorters | stapling | manual feed |
|---|---|---|---|---|
| 2,350 | 26,711 | 4,623 | 584 | 85 |

Although some malfunctions were found at the manual feeder and the control panel, the current condition is satisfactory according to remote monitoring.
* If you have any problems in image quality or noise, please make an automatic repair request call (manual call).
* If you have any questions about the diagnosis report, please contact us at 03-4567-1234.
* The next diagnosis is planned YY/MM/DD.

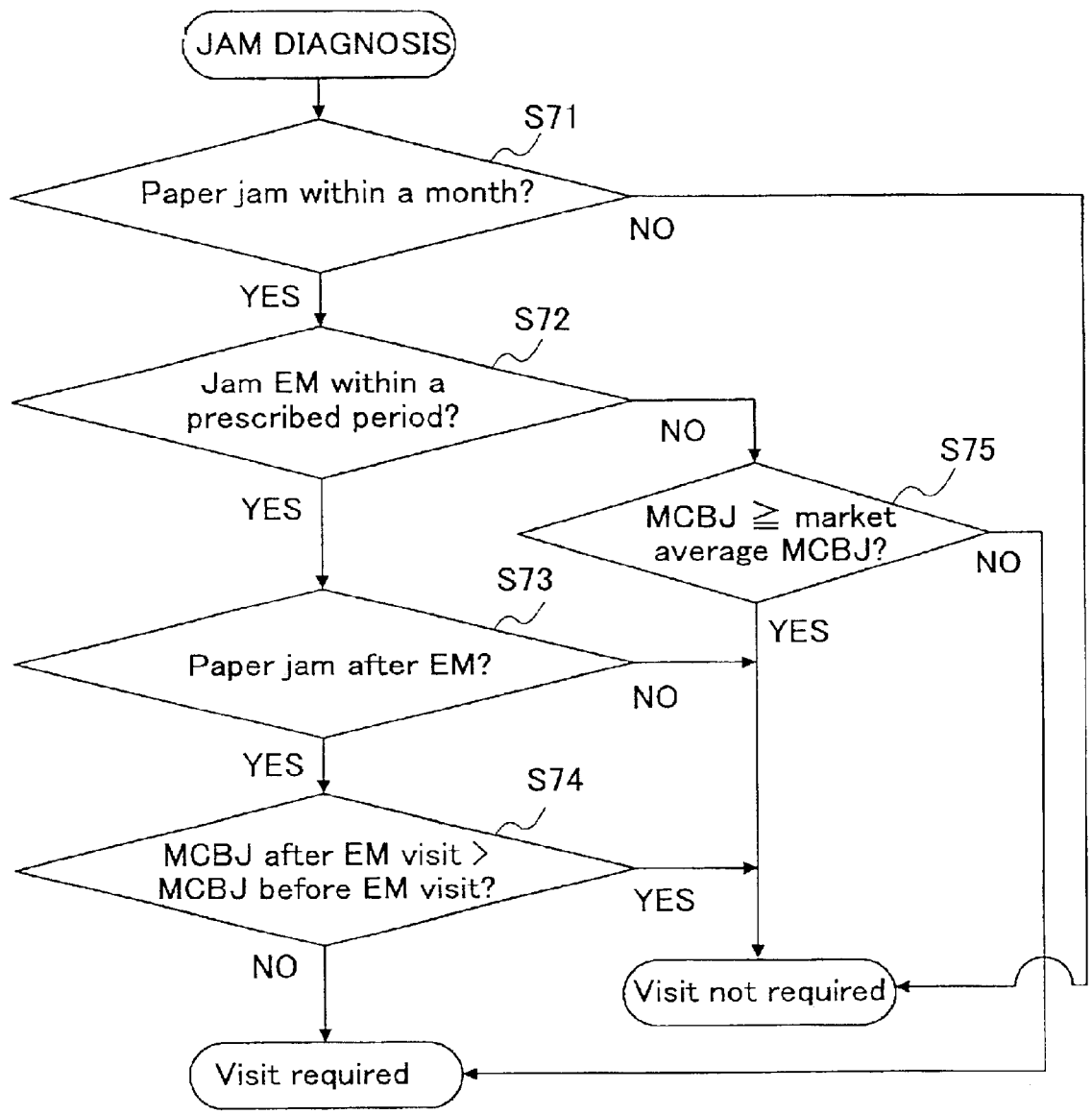

REMOTE MAINTENANCE AND DIAGNOSIS OF OFFICE OR DOMESTIC APPLIANCES

BACKGROUND OF THE INVENTION

1. Field of the Invention

The present invention relates to planned maintenance and diagnosis of office or domestic appliances (such as photocopiers), and more particularly, to remote diagnosis of appliances via a network, involving a remote maintenance and diagnosis apparatus and a client terminal.

2. Description of the Related Art

Various appliances, such as photocopiers, printers, or facsimile machines, are used in offices and houses. There are two types of maintenance of these appliances. One method is that a customer asks for repair when he finds something wrong with his/her appliance, without periodic (or planned) inspection. The other method is that the customer makes a contract with the manufacturer or the service provider to conduct periodic inspection and maintenance. In the latter case, a service person visits the office or the customer's house every few months, for example, to check the operability of the appliance.

In recent years, machines and apparatuses have been furnished with self-diagnosis functions along with the progress in functionalities and capabilities. If some trouble or malfunction (including failures and abnormal conditions) occurd in a machine, the machine itself detects the fault and makes a call to the service call center.

Meanwhile, as the types and the structure of machines and apparatus become diversified and complicated, maintenance services have been more and more specialized, and it has become difficult to keep qualified service persons. Actually, automatic inspection and maintenance by the machine itself are often more reliable than those done by service persons.

In spite of the fact that the rate of trouble occurring in machines is decreasing owing to the improved functionalities, highly specialized maintenance and inspection are still necessary, resulting in increased maintenance cost and time. In fact, such maintenance and inspection have to be conducted by service persons at a regular interval. If the time interval to the next inspection is long, machine trouble is likely to occur due to lack of precautionary measures.

SUMMARY OF THE INVENTION

The present invention was conceived to overcome the problems in the prior art, and it is one of the objects of the invention to realize efficient remote maintenance and diagnosis with decreased cost and time, and to obviate failures or malfunctions in a reliable manner.

To achieve the objective, in one aspect of the invention, a remote maintenance and diagnosis apparatus that carries out remote diagnosis of a client appliance is provided. The remote maintenance and diagnosis apparatus comprises a data acquisition unit that acquires data necessary to diagnose the client appliance, a diagnosing unit that makes an automatic diagnosis of the client appliance based on the data acquired by the data acquisition unit, and an automatic diagnosis result reporting unit that reports a result of the automatic diagnosis to the client appliance.

The acquired data includes, but is not limited to, operating conditions of the client appliance, troubling information, and measures taken to resolve problems. The troubling information includes a service call made by the client appliance when a problem occurs. In this case, the diagnosing unit makes the automatic diagnosis based on the service call. The troubling information also includes a paper jam that has occurred in the client appliance, and the automatic diagnosis may be made by the automatic diagnosis unit based on the occurrence of the paper jam.

This apparatus can automatically make a prompt and accurate diagnosis of the remote client apparatus, and the maintenance cost and time can be reduced.

Preferably, the automatic diagnosis result reporting unit attaches an inquiry when reporting the result of the automatic diagnosis to the client appliance. Such an inquiry includes, for example, a questionnaire about the image quality that can not be covered by the automatic diagnosis.

The remote maintenance and diagnosis apparatus further comprises an interview result entry unit that inputs and registers an interview result, and a diagnosis report creating unit that creates a remote diagnosis customer report based on the interview result and the automatic diagnosis result.

By creating the remote diagnosis customer report based on the interview result and the automatic diagnosis result, a more accurate and thorough customer report can be provided to the user of the client appliance.

In another aspect of the invention, a client appliance that is to be subjected to remote diagnosis is provided. The client appliance comprises a self-diagnosis unit that makes a self-diagnosis of the client appliance itself, an interface that sends a result of the self-diagnosis to an external diagnosis apparatus and receives inquiries from the external diagnosis apparatus, and an operation panel that allows the user to answer the inquiries.

This client apparatus can provide quick answers to-the inquiry in addition to the self-diagnosis result, which enhances the accuracy and the quality of the remote diagnosis.

In still another aspect of the invention, a remote diagnosis system is provided. This system includes a client appliance, and a remote maintenance and diagnosis apparatus connected to the client appliance via a network and diagnosing the client appliance. The remote maintenance and diagnosis apparatus has a data acquisition unit that acquires data necessary for making a diagnosis of the client appliance, an automatic diagnosis unit that makes an automatic diagnosis of the client appliance based on the data acquired by the data acquisition unit, and an automatic diagnosis result reporting unit that reports an automatic diagnosis result to the client appliance.

Preferably, the system further includes a customer appliance administration apparatus that is configured to collect and manage information about the client appliance. The data acquisition unit of the remote maintenance and diagnosis apparatus acquires the data from the customer appliance administration apparatus.

The information about the client appliances is comprehensively managed by the customer appliance administration apparatus, and the remote maintenance and diagnosis apparatus can extract necessary information from the customer appliance administration apparatus at any time to make an automatic diagnosis.

BRIEF DESCRIPTION OF THE DRAWINGS

Other objects, features, and advantages of the invention will become more apparent from the following detailed description when read in conjunction with the accompanying drawings, in which:

FIG. 6 illustrates an example of answering the inquiry through the display panel of the client appliance;

FIG. 7 illustrates an example of an automatic diagnosis report grouped based on the necessity of visit inspection;

FIGS. 8A. 8B and 8C illustrate an example of an automatic diagnosis report generated for each client appliance;

FIG. 9 illustrates an example of initial page (key input page) for entry of interview result;

FIG. 10 illustrates an example of confirmation page of a remote diagnosis customer report;

FIG. 11 illustrates an example of an interview result input page;

FIG. 12 illustrates an example of remote diagnosis customer Report;

FIG. 14 illustrates another example of a diagnosis algorithm used in the automatic diagnosis according to an embodiment of the invention.

DETAILED DESCRIPTION OF THE EMBODIMENTS

Figure 1:
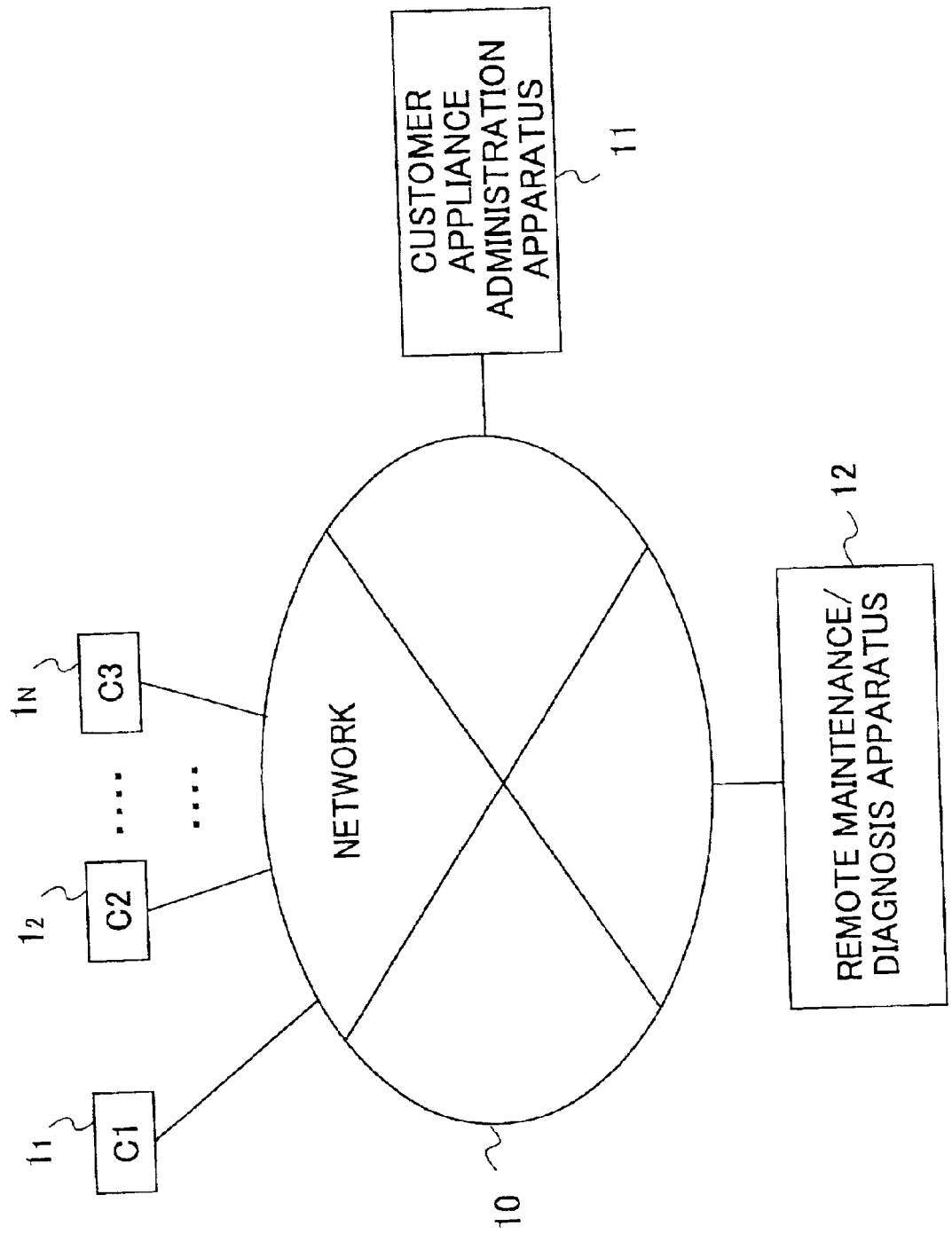
FIG. 1 schematically illustrates a remote maintenance and diagnosis system according to an embodiment of the invention.

The details of the invention will now be described. FIG. 1 illustrates a remote maintenance and diagnosis system according to an embodiment of the invention. The system includes client appliances $1_1$–$1_N$, a customer appliance administration apparatus 11, and a remote maintenance/diagnosis apparatus 12, which are connected with one another via a network 10. The network 10 is any available communication network, such as the Internet, a public telephone network, a local area network, a wide area network, and or so.

The customer appliance administration apparatus 11 and the remote maintenance/diagnosis apparatus 12 may be configured as a single apparatus although in FIG. 1 they are depicted separately. Alternatively, they may be connected with each other via a cable or a private line. The client appliances $1_1$–$1_N$ are, for example, printers, photocopiers, facsimile machines, and so on used in offices or private homes. The client appliances $1_1$–$1_N$ are referred to as client terminals, and the customer appliance administration apparatus 11 and the remote maintenance/diagnosis apparatus 12 are referred to as servers.

The customer appliance administration apparatus 11 collects and manages various information about the client appliances $1_1$–$1_N$, which is required for remote diagnosis of the client appliances. Such information includes, but is not limited to, operational conditions in actual use, troubling information including failures and malfunctions, and measures taken to resolve the troubling problems (i.e., failures and malfunctions). Such information is collected at any time. In this regard, the client appliances $1_1$–$1_N$ may be connected to the customer appliance administration apparatus 11 via a private line, instead of via the network 10.

The customer appliance administration apparatus 11 processes the collected information as needed, and transfers the information to the remote maintenance/diagnosis apparatus 12. On the other hand, the remote maintenance/diagnosis apparatus 12 can access the customer appliance administration apparatus 11 at any time to obtain necessary information relating the use condition, malfunctions, treatment history, etc.

Figure 2:
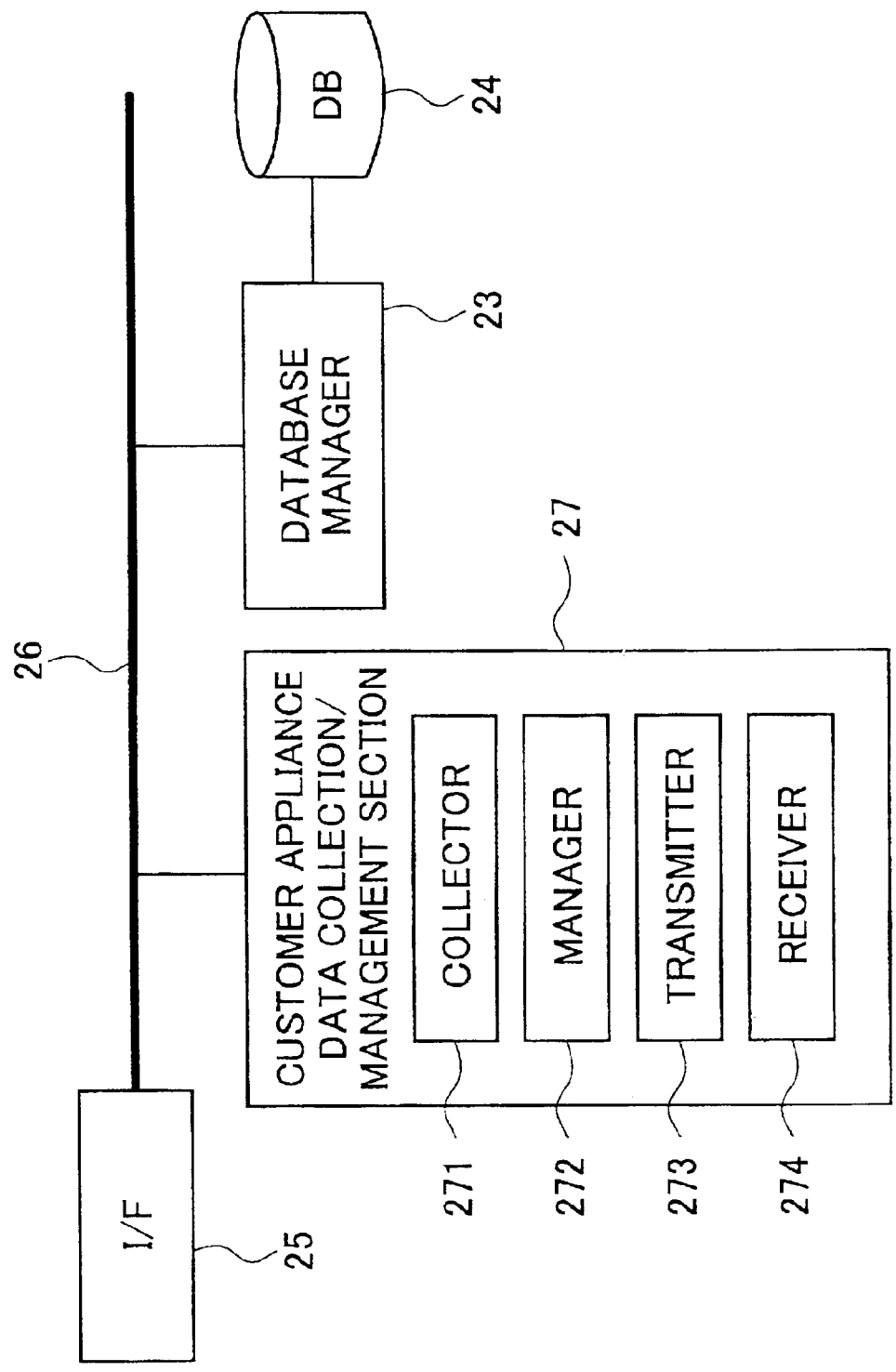
FIG. 2 illustrates a customer appliance administration apparatus used in the system shown in FIG. 1.

FIG. 2 illustrates the structure of the customer appliance administration apparatus 11. The customer appliance administration apparatus 11 has a database 24, a database manager 23, a communication interface 25, and a customer appliance data collection/management section 27, which are connected with each other via a bus 26. The database 24 stores the various information about the client appliances $1_1$–$1_N$ collected by the data collection/management section 27. The data base manager 23 manages the information stored in the database 24. The communication interface 25 allows the customer appliance administration apparatus 11 to connect itself to the network 10, thereby transferring data to and from the client appliances $1_1$–$1_N$ and the remote maintenance/diagnosis apparatus 12.

Although not shown in FIG. 2, the customer appliance administration apparatus 11 also has several processing units. For example, a failure reporting unit reports the failures having occurred in the client appliances $1_1$–$1_N$. A recording unit monitors and records the parts supply history of each appliance. An alarm monitoring unit monitors alarms generated by the client appliances $1_1$–$1_N$. An analyzing unit analyzes problems and alarms and generates instructions in order to take appropriate measures against the problems and alarms. In this regard, the customer appliance administration apparatus 11 functions as a customer support center on the basis of the various information collected about the client appliances $1_1$–$1_N$. The instructions generated by the analyzing unit may be supplied directly to the client appliance 1, for example, or alternately, the customer appliance administration apparatus 11 forwards the instruction to a separate dedicated system that carries out the necessary measures for the client appliances $1_1$–$1_N$.

The data collection/management section 27 has a collector 271, a manager 272, a transmitter 273, and a receiver 274. The collector collects any information about the client appliances $1_1$–$1_N$ at any time or at a regular interval. The manager 272 manages the information collected by the collector 271. The transmitter 273 processes the collected information as needed, and transmits the information to the remote maintenance/diagnosis apparatus 12 at a regular interval or in response to a request from the remote maintenance/diagnosis apparatus 12. The receiver 274 receives appliance information from the client appliances $1_1$–$1_N$ and information request signals from the remote maintenance/diagnosis apparatus 12.

As has been mentioned above, collected information includes operating conditions of the client appliances $1_1$–$1_N$, problems that have occurred in the client appliances $1_1$–$1_N$, and measures taken to resolve the problems. The operating conditions include paper consumption (e.g., the number of copies made for each size or each tray), and electrical and mechanical conditions of various components of the appliance. The troubling information includes failure information, alarm information indicating necessity of maintenance, and any other malfunctions. Measures taken information includes repair history, maintenance and inspection records, and precautions taken in advance.

Each of the client appliances $1_1$–$1_N$ has an automatic diagnosis function and an automatic call function, which will be explained later. If a client appliance detects a failure based on its self-diagnosis function, a service call (SC) is made to the customer appliance administration apparatus 11. The client appliance also makes an automatic urgent call (CC) to the customer appliance administration apparatus 11 when the same type of paper jam has been successively detected a predetermined number of times. Such service calls (SC) and urgent calls (CC) are included in the failure information.

The client appliance automatically makes an alarm call (AC) to the customer appliance administration apparatus 11 if it detects necessity for maintenance as a result of self-diagnosis. The user of the appliance may make a manual call (MC) through manipulation of a display panel if she/he feels malfunction of the appliance. Such alarm calls (AC) and manual calls (MC) are included in alarm information and other malfunction information, respectively. The number of times SC, CC, AC, and MC have been made is also included in the disorder information.

These types of information are stored in the database 24. The remote maintenance/diagnosis apparatus 12 can access the database 24 of the customer appliance administration apparatus 11 to make remote diagnosis of the client appliances $1_1$–$1_N$.

Figure 3:
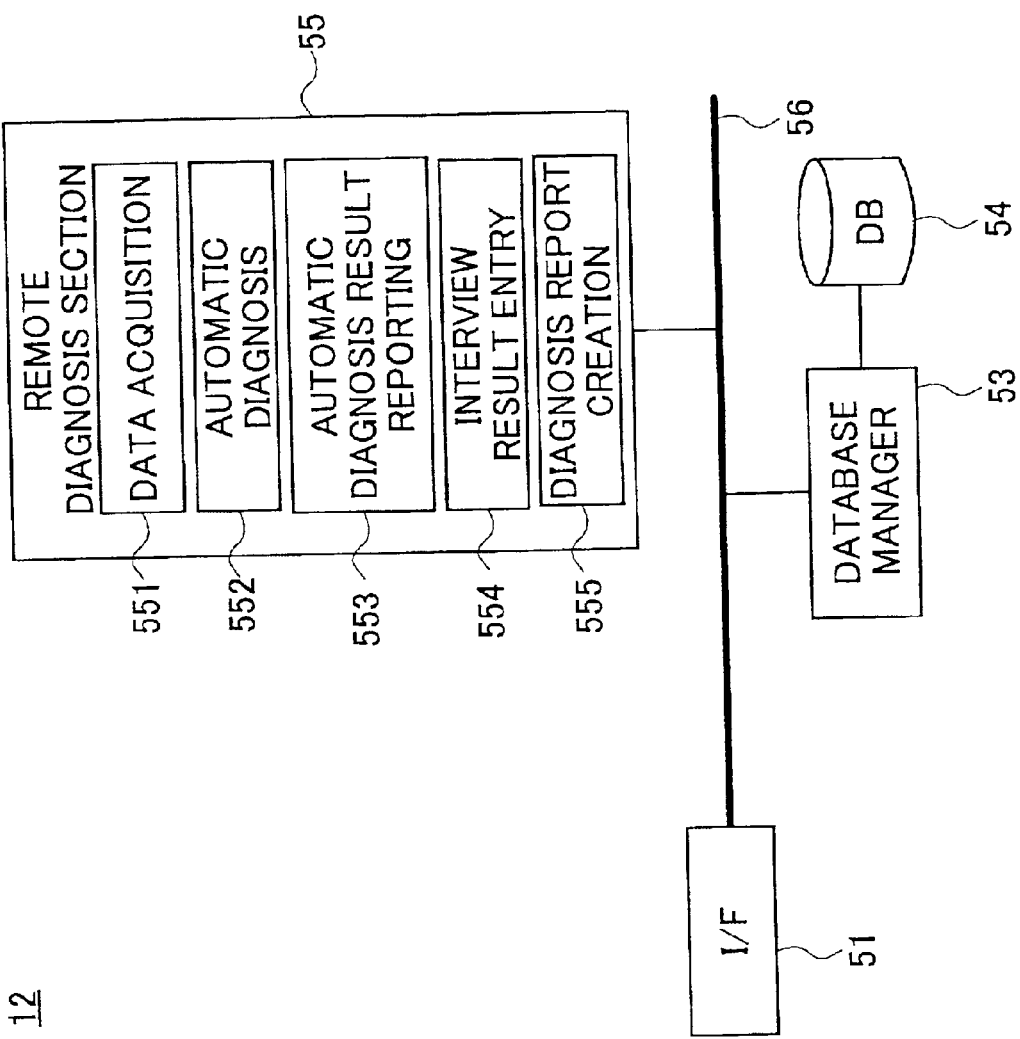
FIG. 3 illustrates a remote maintenance and diagnosis apparatus used in the system shown in FIG. 1.

FIG. 3 illustrates an example of the remote maintenance/diagnosis apparatus 12 used in the system shown in FIG. 1. The remote maintenance/diagnosis apparatus 12 includes a communication interface (I/F) 51, database 54, a database manager 53, and a remote diagnosis section 55, which are connected to one another via a bus 56. The database 53 stores information needed for remote diagnosis of the client appliances. The information is mainly obtained from the customer appliance administration apparatus 11. The database manager 53 manages the database 54. The communication interface 51 allows the remote maintenance/diagnosis apparatus 12 to connect itself to the network 10.

The remote diagnosis section 55 has a data acquisition unit 551, an automatic diagnosis unit 552, an automatic diagnosis result reporting unit 553, an interview result entry unit 554, and a diagnosis report creating unit 555. The data acquisition unit 551 acquires necessary information, such as operating conditions, troubling information (including failures and malfunctions), and measures taken to resolve troubles, which are all required to make remote diagnosis of the client appliances $1_1$–$1_N$. The automatic diagnosis unit 552 executes an automatic diagnosis at a regular time interval or at a planned date based on the data acquired by the data acquisition unit 551. The interval of the automatic diagnosis can be set arbitrary by, for example, the contract or a request from the user. If the time interval between automatic diagnoses is set short, problems such as failures or malfunctions of the client appliance can be prevented effectively. The result of the automatic diagnosis is reported to the client appliance by the automatic diagnosis result reporting unit 553.

The interview result entry unit 554 receives and registers inputs of interview results, which is to be used when finally making a remote diagnosis customer report. Interviews are conducted between the customer and the customer engineer or the support operator by telephone, e-mail, or other suitable communication means generally after the automatic diagnosis has been made. The interview result is input to the interview result entry unit 554 by the customer engineer or the support operator.

The diagnosis report creating unit 555 creates a remote diagnosis customer report based on the automatic diagnosis result and the interview result. The remote maintenance/diagnosis apparatus 12 transfers the remote diagnosis customer report to the customer appliance administration apparatus 11 via the network 10, or via a private line or a cable if they are connected to each other using such means. The customer appliance administration apparatus 12 stores the remote diagnosis report for each customer, and at the same time, sends the remote diagnosis report to the customer by an appropriate means (e.g,. by mail, facsimile, e-mail, etc.).

As an alternate, the customer appliance administration apparatus 11 may create a remote diagnosis customer report. In this case, the remote maintenance/diagnosis apparatus 12 transfers the automatic diagnosis result and the interview result to the customer appliance administration apparatus 11.

Figure 4:
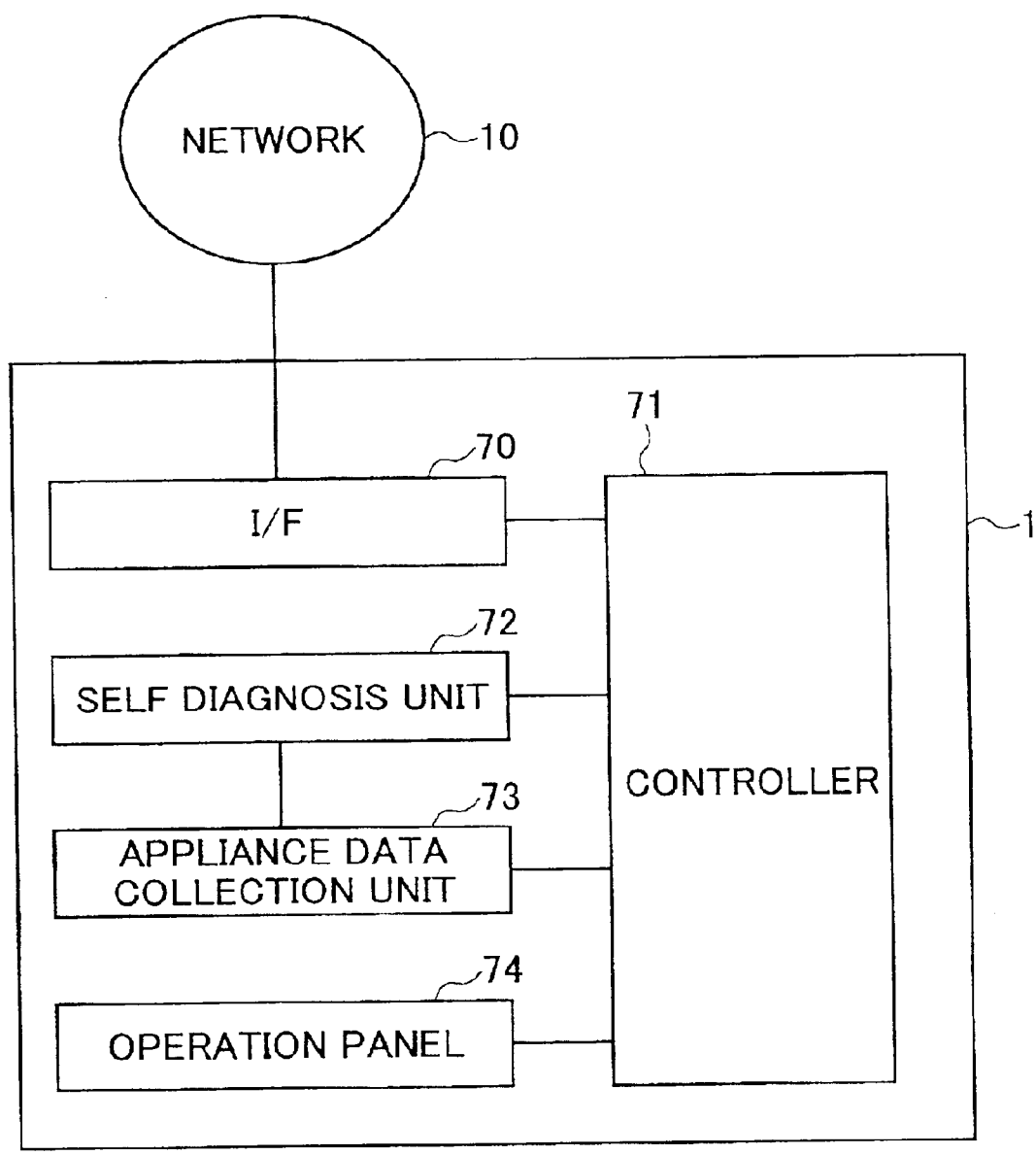
FIG. 4 illustrates a client terminal connected to a network and used in the system shown in FIG. 1.

FIG. 4 illustrates an example of the client appliance 1 that is to be subjected to planned remote diagnosis. The client appliance 1 is, for example, a printer, a photocopier, a facsimile machine, etc. for purposes of office and domestic use. The client appliance 1 has a communication interface (I/F) 70, a controller 71, a self-diagnosis unit 72, an appliance data collection unit 73, and an operation panel 74, which are attached to the main body.

The controller 71 controls the entire operations of the appliance 1, including the operations of the interface 70, the self-diagnosis unit 72, the appliance data collection unit 73, and the operation panel 74.

The self-diagnosis unit 72 makes automatic diagnosis of the appliance 1 itself, based on the various data collected by the appliance data collection unit 73, and transfers the self-diagnosis data to the customer appliance administration apparatus 11 via the communication interface 70. The self-diagnosis data includes a determination if some parts are out of order, or in the alarmed condition requiring prompt maintenance. If the self-diagnosis unit 72 determines that some parts are out of order, the controller 71 transfers the failure information to the customer appliance administration apparatus 11 via the network 10 or any private line (not shown). If the self-diagnosis unit 72 detects some malfunctions that require maintenance, then the controller 71 transfers the alarm information to the customer appliance administration apparatus 11. These kinds of information are expressed by data codes, and temporarily stored in a buffer (not shown) in the self-diagnosis unit 72, prior to being transferred to the customer appliance administration apparatus 11. The controller 71 converts the data codes into appropriate formats suitable to the network 10, if the data are transmitted via the network 10.

The appliance data collection unit 73 collects operational condition data, in addition to troubling information. Operational condition data includes paper consumption for each paper size and each tray, and the past and current electrical and mechanical conditions. The operational condition data are collected at any time or at a regular time interval, and stored in storage (not shown). The appliance data collection unit 73 may be configured so as to collect the operational condition data when a request is received from the customer appliance administration apparatus 11. The appliance data collection unit 73 may also detect chemicals that adversely affect the environment, noise, an electric voltage, a pressure, signal timing, colors, tone and density, contamination, and so on.

The operation panel 74 includes manipulation keys and a screen on which an automatic remote diagnosis result and inquiries are displayed when a planned remote diagnosis is made. The user can confirm the automatic remote diagnosis result, and answer the inquiries through the screen and the manipulation keys.

Figure 5:
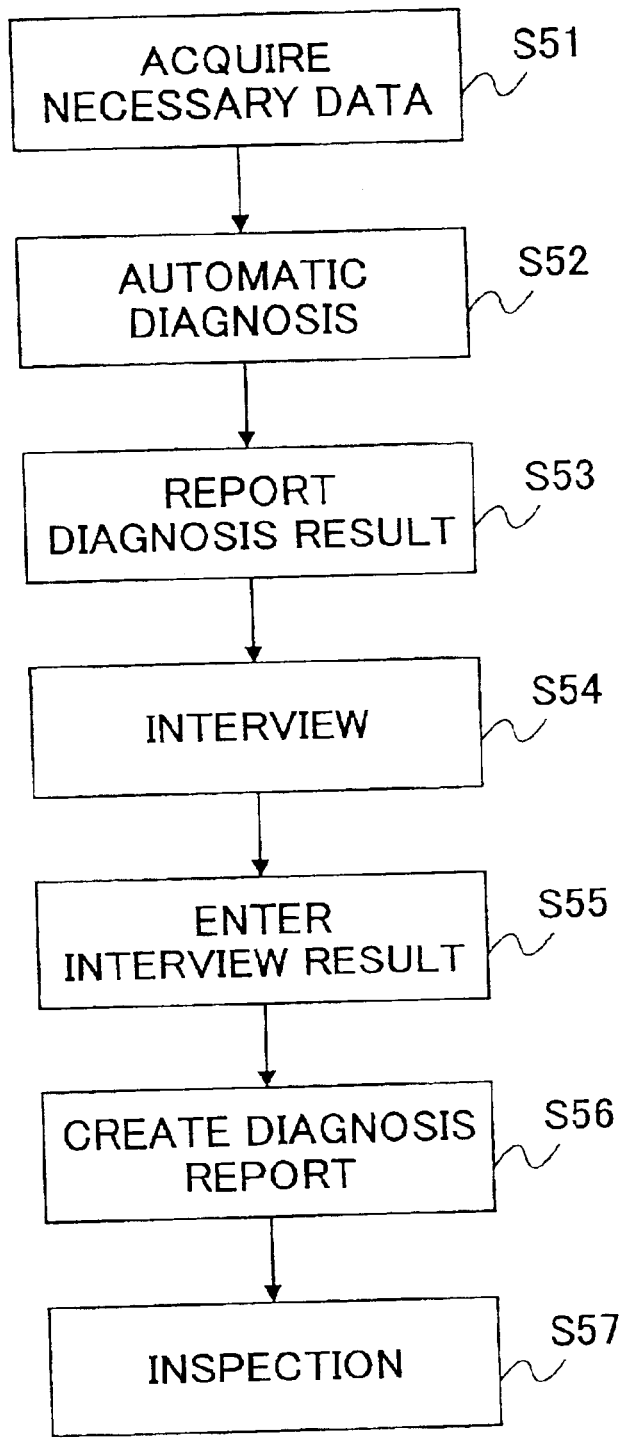
FIG. 5 illustrates an operation flow of planned diagnosis according to an embodiment of the invention.

FIG. 5 illustrates an operation flow of planned remote diagnosis carried out by the remote maintenance/diagnosis apparatus 12. In step 51, necessary data required by remote diagnosis are acquired by the data acquisition unit 551 from the customer appliance administration apparatus 11. The acquired data are stored in the database 54. The necessary data include the operational condition of the client appliance that is to be diagnosed, troubling information, measures taken information, and other data. If some information is lacking for making a remote diagnosis, the data acquisition unit 551 requests the customer appliance administration apparatus 11 to collect and supply the information.

In step 52, the automatic diagnosis unit 552 carries out automatic diagnosis using the operational condition information, troubling information, and measures taken information taken to resolve the trouble, for example, 10 days before the scheduled remote inspection date. Based on the automatic diagnosis result, it is again automatically determined whether or not a visit inspection is required for planned maintenance. The automatic diagnosis result may be changed according to the interview result, which is explained below.

In step 53, the automatic diagnosis result reporting unit 553 reports the automatic diagnosis result, including the necessity of a visit inspection, to the customer. There are several ways to report the automatic diagnosis result.

The first method is to e-mail the automatic diagnosis result and inquiries to the customer using a registered electronic mailing address. If it has been determined that visit inspection is required due to a bad condition of a certain component of the. customer's appliance, the reason for it is enclosed in the e-mail automatically, asking for consent of the customer for the visit inspection. At the same time, the inquiries includes whether the customer has found any abnormal operation in the appliance. Answers to the inquiries are made by e-mail or telephone, through the operation panel of the appliance, etc.

The second method is to send by facsimile the automatic diagnosis result and inquiries to the customer using a registered facsimile number. The transmission contents are the same as the first method. Answers to the inquiries may be made by facsimile or telephone, through the operation panel, etc.

FIG. 6(A) illustrates an example of key manipulation when answering the inquiries through the operation panel, and FIG. 6(B) illustrates an inquiry displayed on the screen. For example, the user successively hits the RESET/PREHEAT key, and the zero (0) key, and then, depresses CLEAR/STOP key for three seconds. Then, an inquiry page turns up on the screen. The user can select a number from the listed answers. The inquiries may include confirmation of the facsimile number to which the diagnosis report should be transmitted, and a confirmation of the visit inspection date.

The third method is to transmit the automatic diagnosis result and the inquiries from the automatic diagnosis result reporting unit 553 of the remote maintenance/diagnosis apparatus 12 directly to the customer's appliance. In this case, the client (or the customer's) appliance receives the automatic diagnosis result and the inquiries via the network 10 and the interface 70, which are then displayed on the operation panel 74. The user (i.e., the customer) answers the inquiries through the operation panel.

The fourth method is to automatically deliver a automatic diagnosis report to an associated office or department that is in charge of maintenance of the customer's appliance. FIG. 7 illustrates an example of the automatic diagnosis report, which is entitled "Planned Remote Diagnosis List". This "Planned Remote Diagnosis List" includes the items of ① automatic diagnosis date at which automatic diagnosis shown in step S52 in FIG. 5 is carried out, ② planned inspection date which is determined in advance by, for example, contract, ③ diagnosis result indicating whether or not a visit inspection is required, ④ report number that functions as a control number for the customer report of remote maintenance/diagnosis, ⑤ mail address and facsimile number to which the remote diagnosis report is to be addressed, and ⑥ interview result which is checked each time an interview has been conducted. Concerning item ⑤, the remote diagnosis report is sent by mail, e-mail, facsimile, dr any combination thereof, in compliance with customers' wishes.

The automatic remote diagnosis report (e.g., "Planned Remote Diagnosis list") can be output for each department or office that is in charge of remote maintenance, each result (depending on whether or not a visit inspection is required), each customer, or each appliance. An example of the automatic remote diagnosis repot that is output for each appliance is illustrated in FIG. 8. In this case, the report include's detailed information of the operational state of the appliance and a consultation history.

Among the above described first through fourth methods, the first and second methods are suitable if inquiries and the answers to them are simple. The fourth method is suitable if inquiries are complicated including a wide variety of topics. The third method is in between the former and the latter.

Returning to FIG. 5, an interview is conducted in step S54 based on the automatic diagnosis result. Such interview may be conducted using a questionnaire, which is forwarded to the customer in advance together with the automatic diagnosis result, or conducted by telephone. If, in the previous step (S53), the first or second method for sending the automatic diagnosis result is taken, the inquiry has already been forwarded to the customer, and answers to the inquiry are made by e-mail, facsimile, telephone, or through the display panel of the customer's appliance. The customer's answers (i.e., the interview result) may be directly taken in the remote maintenance/diagnosis apparatus 12. Alternatively, the customer engineer (CE) or the support operator in charge with the maintenance of the appliance checks the customer's answers (i.e., the interview result) prior to inputting the interview result into the remote maintenance/diagnosis apparatus 12. In the latter case, the customer engineer (CE) or the support operator may reconfirm the customer's answers, for example, by telephone if necessary.

If the fourth method is taken in step S53, the customer engineer or the support operator calls the customer, and conducts a telephone interview using the automatic diagnosis report shown in FIG. 8. In this case, the customer engineer or the support operator may retrieve necessary information regarding the client appliances $1_1$~$1_N$, such as operational condition, trouble history, or measures taken to resolve the problems, prior to the telephone interview. Such information may be taken out of the database 54 of the remote maintenance/diagnosis apparatus 12 or the database 24 of the customer appliance administration apparatus 11.

The interview in step S54 is conducted for the purpose of obtaining additional information (such as image quality or image deterioration) that cannot be covered by the automatic remote diagnosis, and reflecting the customer's current demands. Taking the interview result into account, it is to be determined finally whether or not a visit inspection is required. The actual visiting date may be arranged during the interview.

In step S55, the interview result is entered. FIG. 9 illustrates an example of the initial page (or the key input page) for entry of the interview result. The initial page shown in FIG. 9 includes the items of ① Section code to which the inputting person (i.e., the customer engineer) belongs, ② CE code, ③ Date of automatic remote diagnosis (carried out in step S52), ④ Appliance type and product number (This item may be replaced by the IPV6 internet address), ⑤ Report number cited in the automatic remote diagnosis report, and ⑥ Option between (1) inputting the interview result and (2) confirming the automatic diagnosis customer report.

If option (2) is selected in item ⑥, the initial page is switched to the remote diagnosis report confirmation page in which the remote diagnosis customer report that has been roughly prepared based on the automatic diagnosis result is contained. An example of the confirmation page is shown in FIG. 10. This confirmation page exhibits information about the section code, the name of the customer engineer (that corresponds to the CE code), the report number, the customer's name and address, the facsimile number, the appliance type and the product number, the location at which the appliance is set, the automatic diagnosis date, the automatic diagnosis result, the interview result, the operating conditions of the appliance, the number of copies, and some comments. The interview result and the comments (shown in FIG. 10) reflect the contents of the entry of the interview result, which will be explained in more detail below.

If option (1) is selected in item ⑥ of FIG. 9, the initial page is switched to the interview result input page, an example of which is shown in FIG. 11. The interview result input page already contains the information about the section name, the name of the customer engineer (CE), the appliance type and the product number, the automatic remote diagnosis date, the planned date, the automatic diagnosis result, and the report number.

With this page, the customer engineer (CE) inputs information about ① the interview result (simply selecting whether or not a visit inspection is required), ② reasons for change if the interview result differs from the automatic diagnosis result carried out in step S54, ③ scheduled visiting date if the interview result requires a visit inspection, ④ location of the appliance (if different from the location registered in the automatic remote diagnosis report), ⑤ registered mailing address, and ⑥ type of transmission (by facsimile or other means).

In step S56 of FIG. 5, a planned remote diagnostic report is created by the diagnosis report creating unit 555 based on the automatic diagnosis result and the interview result. If the interview result and the automatic diagnosis result conflict with each other in some points, the interview result takes priority over the automatic diagnosis result. Accordingly, if the interview result obtained in step S54 differs from the automatic diagnosis result of step S52, the final diagnosis result written in the planned remote diagnostic report is automatically changed so as to agree with the interview result.

For example, if the interview result leads to the necessity of a visit inspection and this result is entered in the input page in step S55, then the planned remote diagnostic report conveys the necessity of visit inspection, even if the automatic diagnosis result obtained in step S52 does not exhibit the necessity of a visit inspection. This change also causes an entry on the remote diagnosis report confirmation page (shown in FIG. 10) to change. That is, the item "Others/option" is changed from "Good" to "Inspection required."

Similarly, if it is judged through the interview that a visit inspection is not required, then the current operating conditions of the components (e.g., the reading unit, the writing unit, the drum and its surroundings, the paper feeder, the ADF, etc.) are all changed to "Normal (or Good)" in the planned remote diagnostic report.

FIG. 12 illustrates an example of the planned remote diagnostic report that is to be sent to the customer. The current monitoring results are given as to the major components (i.e., the reading unit, the writing unit, the drum and its surroundings, the feeder, and the ADF) of the appliance. In this example, it is assessed that all of these components operate in the normal state, and is determined that a visit inspection is not required. The report also conveys the record of the number of copies for each paper size.

FIGS. 13A–13C and FIG. 14 illustrate operation flows of the automatic diagnosis carried out in step S52 in FIG. 5. The examples shown in FIGS. 13A–13C execute automatic diagnosis based on service calls (SC), which are automatically made when the client appliance detects problems using the self-diagnosis function. The example shown in FIG. 14 executes automatic diagnosis based on a paper jam.

Figure 13A:
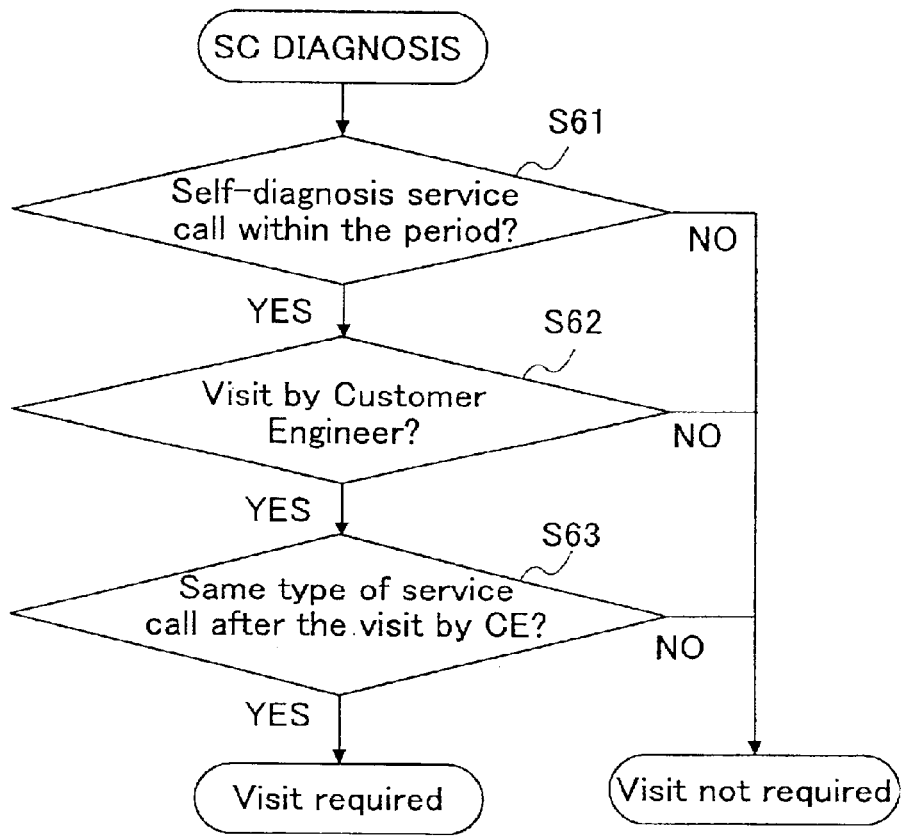
FIGS. 13A through 13C illustrate examples of diagnosis algorithms used in the automatic diagnosis according to an embodiment of the invention.

In the flow of FIG. 13A, it is first determined whether or not a self-diagnosis service call (SC) has been made within a predetermined period of time in step S61. If there is no service call in this period (NO in S61), it is assumed that the appliance has no problems, and therefore, no visit inspection is required. If there are any service calls (YES in S61), then, it is determined in step S62 whether or not a visit inspection by a customer engineer has been made. If there is no record of a visit inspection (NO in S62), it is assumed that the problem has been overcome without visit, and therefore, it is determined that no visit inspection is required.

If there is a record of a visit inspection (YES in S62), then it is determined in step S63 whether or not the same type of service call has been made since the visit by the customer engineer. If the same type of service call is again made (YES in S63), it means that the same type of problem still occurs even after the appliance has been repaired by the customer engineer, and therefore, another visit inspection is required. If the same type of service call has not been received since the customer engineer's visit (NO in S63), the appliance has been correctly repaired, and no additional visit is required.

Figure 13B:
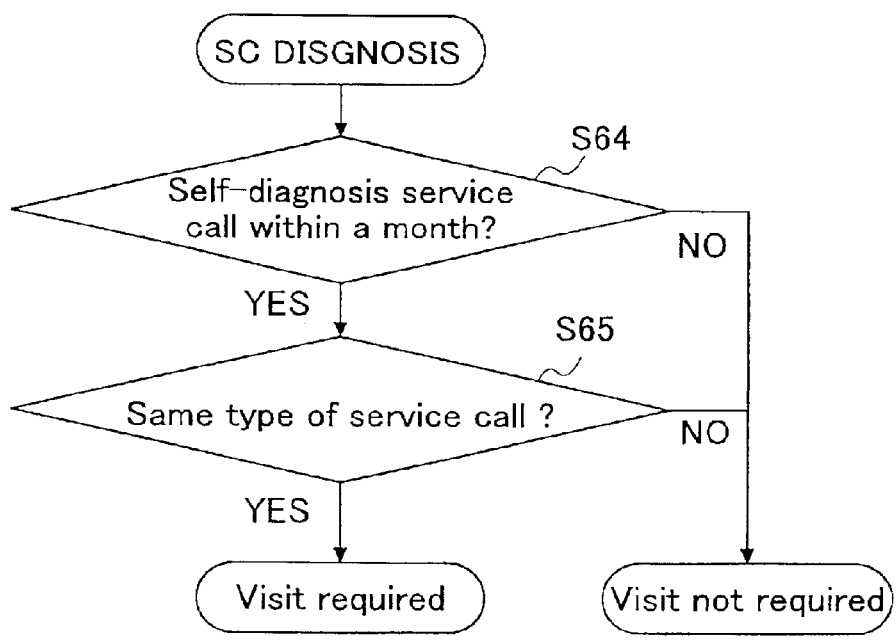

FIG. 13B shows a modification of the algorithm shown in FIG. 13A. First, in step S64, it is determined whether or not a service call based on the self-diagnosis function of the appliance is made within a month since the last diagnosis. If there is no service call within a month (NO in S64), it is assumed that the client appliance works well without trouble, and it is determined that no visit is required.

If there is a service call within a month (YES in S64), then it is determined in step S65 whether or not there is another service call of the same type within this period. If there is no more of the same type of service call (NO in S65) made in this period, it is assumed that the problem has been resolved, and is determined that visit inspection is not required. On the other hand, if the same type of service call is made within the same period (YES in S65), it means that the problem has not been fixed yet, and therefore, it is determined that a visit inspection by the customer engineer is required.

Since a service call of a type that has a high probability of occurring again tends to occur within a relatively short time, it is effective to check for the occurrence of the service call within a month since the last diagnosis. In contrast, a service call of a type that can be coped with remotely may be omitted from the basis of the automatic diagnosis.

Figure 13C:
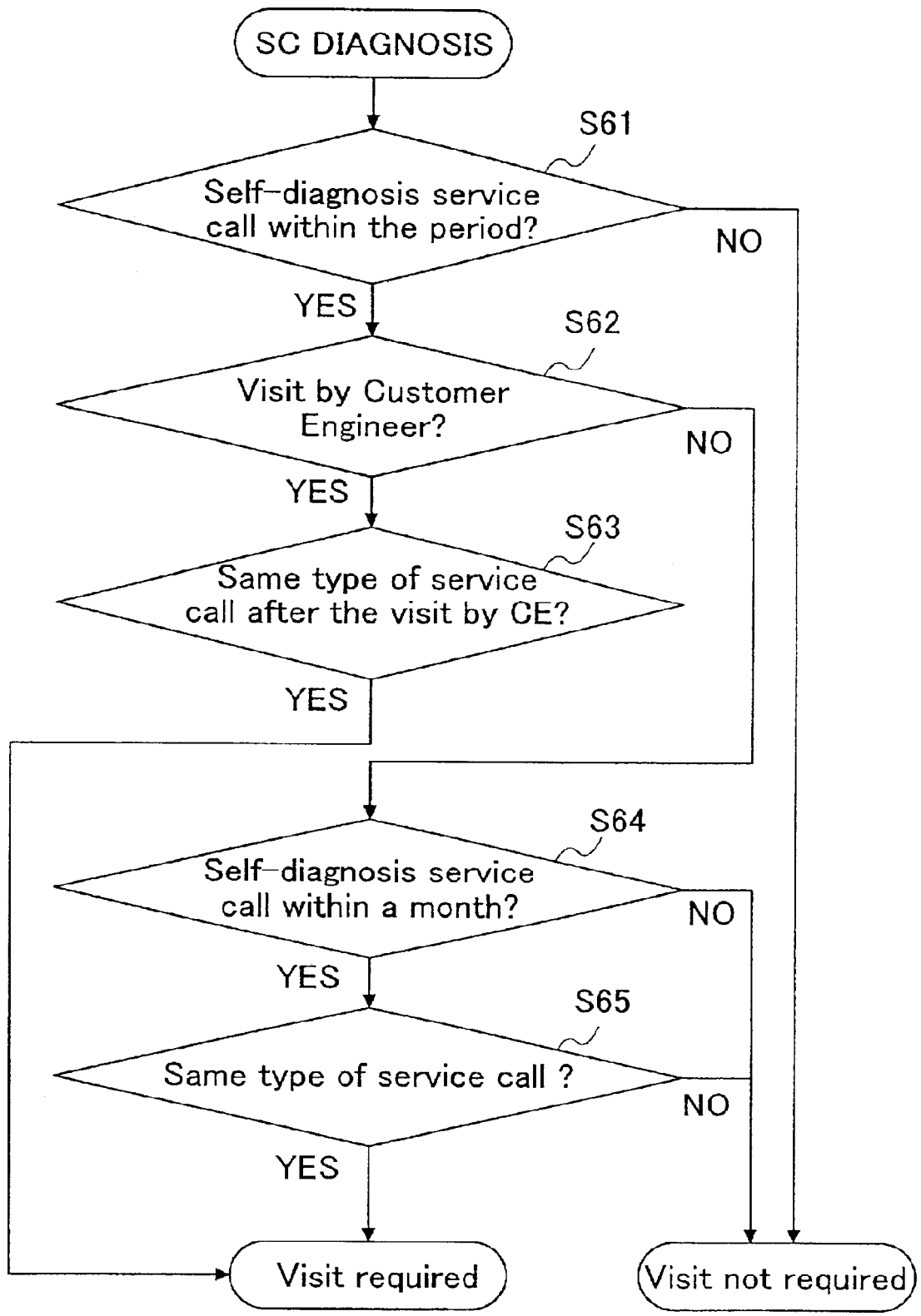

The algorithms shown in FIGS. 13A and 13B may be combined, as illustrated in FIG. 13C. In this case, the determination shown in FIG. 13A is executed first. If a visit by the customer engineer has not taken place (NO in S62) even after a self-diagnosis service call has been made within the predetermined period of time, then the process proceeds to step S64, in which it is determined whether a self-diagnosis service call has been made within the latest one month. Any one of these algorithms can be selected depending on various factors, such as the type of appliance, the frequency of problems or failure, location of the appliances, and so on.

FIG. 14 illustrates an example of operation flow of an automatic diagnosis based on paper jam information. First, in step S71, it is determined whether or not a paper jam occurred within a month. If there is no paper jam having occurred (NO in S71), it is assumed that the appliance works well, and is determined that no visit is required. If paper jam has occurred within a month (YES in S71), then, it is determined in step S72 whether or not jam EM (emergency measures) has been taken within a period longer than a month. If there is no jam EM taken within the period longer than a month (NO in S72), the process proceeds to step S75, in which the operating condition of the appliance is determined based on the mean copies between jams (MCBJ). To be more precise, in step S75, the MCBJ of the client appliance is compared with the market average of MCBJ of a similar appliance, and it is determined if the MCBJ of the client appliance is equal to or greater than the market average MCBJ (client MCBJ≧market average MCBJ). It the client MCBJ is equal to or greater than the market average MCBJ (YES in S75), then it is determined that a visit inspection is not required. If the client MCBJ is below the market average MCBJ (NO in S75), it is determined that a visit inspection is required.

If in step S72 there is a jam EM taken within a predetermined period longer than a month (YES in S72), then it is determined in step S73 whether or not a paper jam has occurred again after the jam emergency measures (EM). If there is no paper jam after the EM (NO in S73), it is assumed that paper jam has been fixed, and is determined that no visit inspection is required. If a paper jam has still occurred even after the EM (YES in S73), then it is determined in step S74 whether the mean copies between jams (MCBJ) after the EM visit is greater than the mean copies between jams (MCBJ) before the EM visit. If the MCBJ after the EM visit is greater than the MCBJ before the EM visit (YES in S74), it is assumed the operating condition of the appliance is improved, and it is determined that a visit inspection is not required. If the MCBJ after the EM visit does not exceeds the MCBJ before the EM visit (NO in S74), then it is determined that a visit inspection is required.

Preferably, the market average MCBJ is automatically updated using the updated market data of, for example, 3 months. The factors for determining the necessity of a visit inspection are not limited to the occurrence of service calls and paper jams, and any other suitable factors can be used. In addition, the client MCBJ at the time of determination may be compared with the client MCBJ at the time of occurrence of the paper jam, instead of the market average MCBJ.

By carrying out automatic diagnosis based on the collected data (including the self-diagnosis result supplied form the client appliance itself), a rough diagnosis can be made promptly under the automatic control. By conducting an interview using the automatic diagnosis result, a more thorough diagnosis can be made using detailed information from the customer that can not be covered by the automatic diagnosis. The final judgment is reported in the planned remote diagnosis report based on both the automatic diagnosis and the interview, giving priority to the interview result if the automatic diagnosis result and the interview result are inconsistent. Consequently, necessity and timing of a visit inspection by a specialized customer engineer can be determined in the reasonable manner, and flexible maintenance and inspection can be realized. With this system and method, serious problems in the customer's appliance can be prevented in advance, while maintenance time and labor costs can be reduced.

Although the present invention has been described using specific examples, the invention is not limited to these examples, and there are many substitutions and modifications that can be made without departing from the scope of the invention.

This patent application is based on and claims the benefit of the earlier filing date of Japanese patent application Nos. 2001-135286 and 2001-316680 filed May 2, 2001 and Oct. 15, 2001, respectively, the entire contents of which are hereby incorporated by reference.

What is claimed is:

1. A remote maintenance and diagnosis apparatus configured to diagnose remote client appliance, the apparatus comprising:
   a data acquisition unit configured to acquire data collected from the client appliance, the data collected via a customer appliance administration apparatus and including information to diagnose an increased likelihood of malfunction of the client appliance;
   a diagnosing unit configured to make an automatic diagnosis of the client appliance based on the data acquired by the data acquisition unit; and
   an automatic diagnosis result reporting unit configured to report a result of the automatic diagnosis to the client appliance.

2. The apparatus according to claim 1, further comprising:
   an interview result entry unit configured to input and register a result of an interview; and
   a diagnosis report creating unit configured to creates a remote diagnosis customer report based on the result of the automatic diagnosis and the result of the interview.

3. The remote maintenance and diagnosis apparatus according to claim 1, wherein
   the data collected includes information concerning at least one of operational condition, trouble history, and prior measures taken to resolve problems of the client appliance, and
   the automatic diagnosis result reporting unit is configured to periodically report the result of the automatic diagnosis to the client appliance.

4. The apparatus according to claim 3, wherein the trouble history includes a service call made by the client appliance when a problem occurs, and the diagnosing unit makes the automatic diagnosis based on the service call.

5. The apparatus according to claim 3, wherein trouble history includes a paper jam that has occurred in the client appliance, and the diagnosing unit makes the automatic diagnosis based on the occurrence of the paper jam.

6. The remote maintenance and diagnosis apparatus according to claim 3, wherein the data collected includes information concerning detection of at least one of paper consumption, chemicals, noise, electric voltage, pressure, signal timing, image tone, and image density.

7. A client appliance comprising:
   a self-diagnosis unit configured to make a self-diagnosis of the client appliance, the data collected via a customer appliance administration and including information to diagnose an increased likelihood of malfunction of the client appliance;

an interface configured to send a result of the self-diagnosis to an external diagnosis apparatus and receive inquiries from the external diagnosis apparatus; and an operation panel configured to allow a user to answer the inquiries.

8. The client appliance according to claim 7, wherein the data collected includes information concerning at least one of operational condition, trouble history, and prior measures taken to resolve problems of the client appliance, and the interface is configured to periodically send the result of the self-diagnosis to the external diagnosis apparatus.

9. The client appliance according to claim 8, wherein the data collected includes information concerning detection of at least one of paper consumption, chemicals, noise, electric voltage, pressure, signal timing, image tone, and image density.

10. A remote diagnosis system comprising:

a client appliance; and a remote maintenance and diagnosis apparatus connected to the client appliance via a network and diagnosing the client appliance, the remote maintenance and diagnosis apparatus having:

a data acquisition unit configured to acquire data collected from the client appliance, the data collected via a customer appliance administration apparatus and including information to diagnose an increased likelihood of malfunction of the client appliance;

an automatic diagnosis unit configured to make an automatic diagnosis of the client appliance based on the data acquired by the data acquisition unit; and an automatic diagnosis result reporting unit configured to report a result of the automatic diagnosis to the client appliance.

11. The system according to claim 10, wherein the data acquisition unit of the remote maintenance and diagnosis apparatus acquires the data from the customer appliance administration apparatus.

12. The system according to claim 10, wherein the automatic diagnosis result reporting unit reports the result of the automatic diagnosis to the client apparatus via the customer appliance administration apparatus.

13. The remote diagnosis system according to claim 10, wherein the data collected includes information concerning at least one of operational condition, trouble history, and prior measures taken to resolve problems of the client appliance, and the automatic diagnosis result reporting unit is configured to periodically report the result of the automatic diagnosis to the client appliance.

14. The remote diagnosis system according to clam 13, wherein the data collected includes information concerning detection of at least one of paper consumption, chemicals, noise, electric voltage, pressure, signal timing, image tone, and image density.

15. A remote diagnosis method of diagnosing a remote client appliance, comprising the steps of:

acquiring data collected from the client appliance, the data collected via a customer appliance administration apparatus and including information to diagnose an increased likelihood of malfunction of the client appliance;

making an automatic diagnosis of the client appliance at a remote maintenance and diagnosis apparatus based on the acquired data; and reporting a result of the automatic diagnosis to the client appliance.

16. The method according to claim 15, further comprising the steps of:

entering an interview result into the remote maintenance and diagnosis apparatus; and creating a remote diagnosis report automatically based on the result of the automatic diagnosis and the interview result.

17. The method according to claim 15, wherein the automatic diagnosis step includes determination of whether or not there is a service call made by the client appliance within a predetermined period of time.

18. The method according to claim 15, wherein the automatic diagnosis step includes determination of whether or not a paper jam occurred in the client appliance within a predetermined period of time.

19. The remote diagnosis method according to claim 15, wherein the data collected includes information concerning at least one of operational condition, trouble history, and prior measures taken to resolve problems of the client appliance, reporting of the result of the automatic diagnosis to the client appliance is performed periodically.

20. The remote diagnosis method according to claim 19, wherein the data collected includes information concerning detection of at least one of paper consumption, chemicals, noise, electric voltage, pressure, signal timing, image tone, and image density.

21. A remote maintenance and diagnosis apparatus configured to diagnose a remote client appliance, the apparatus comprising:

a data acquisition unit configured to acquire data collected from the client appliance, the data collected via a customer appliance administration apparatus and including information to diagnose an increased likelihood of malfunction of the client appliance;

a diagnosing unit configured to make an automatic diagnosis of the client appliance based on the data acquired by the data acquisition unit; and an automatic diagnosis result reporting unit configured to report a result of the automatic diagnosis, together with an inquiry, to the client appliance.

22. The apparatus according to claim 21, further comprising:

an interview result entry unit configured to input and register a result of an interview, the interview being conducted based on the inquiry; and a diagnosis report creating unit configured to creates a remote diagnosis customer report based on the result of the automatic diagnosis and the result of the interview.

23. The remote maintenance and diagnosis apparatus according to claim 21, wherein the data collected includes information concerning at least one of operational condition, trouble history, and prior measures taken to resolve problems of the client appliance, and the automatic diagnosis result reporting unit is configured to periodically report the result of the automatic diagnosis, together with the inquiry, to the client appliance.

24. The remote maintenance and diagnosis apparatus according to claim 23, wherein the data collected includes information concerning detection of at least one of paper consumption, chemicals, noise, electric voltage, pressure, signal timing, image tone, and image density.

25. A remote diagnosis system comprising:

a client appliance; and a remote maintenance and diagnosis apparatus connected to the client appliance via a network and diagnosing the client appliance, the remote maintenance and diagnosis apparatus having:

a data acquisition unit configured to acquire data collected from the client appliance, the data collected via a customer appliance administration apparatus and including information to diagnose an increased likelihood of malfunction of the client appliance;

an automatic diagnosis unit configured to make an automatic diagnosis of the client appliance based on the data acquired by the data acquisition unit; and an automatic diagnosis result reporting unit configured to report a result of the automatic diagnosis, together with an inquiry, to the client appliance.

26. The remote diagnosis system according to claim 25, wherein the data collected includes information concerning at least one of operational condition, trouble history, and prior measures taken to resolve problems of the client appliance, and the automatic diagnosis result reporting unit is configured to periodically report the result of the automatic diagnosis, together with the inquiry, to the client appliance.

27. The remote diagnosis system according to claim 26, wherein the data collected includes information concerning detection of at least one of paper consumption, chemicals, noise, electric voltage, pressure, signal timing, image tone, and image density.

28. A remote diagnosis method of diagnosing a remote client appliance, comprising the steps of:

acquiring data collected from the client appliance, the data collected via a customer appliance administration apparatus and including information to diagnose an increased likelihood of malfunction of the client appliance;

making an automatic diagnosis of the client appliance at a remote maintenance and diagnosis apparatus based on the acquired data; and reporting a result of the automatic diagnosis, together with an inquiry, to the client appliance.

29. The remote diagnosis method according to claim 26, wherein the data collected includes information concerning at least one of operational condition, trouble history, and prior measures taken to resolve problems of the client appliance, reporting of the result of the automatic diagnosis, together with the inquiry, to the client appliance is performed periodically.

30. The remote diagnosis method according to claim 29, wherein the data collected includes information concerning detection of at least one of paper consumption, chemicals, noise, electric voltage, pressure, signal timing, image tone, and image density.

* * * * *